United States Patent
Smallwood et al.

(10) Patent No.: US 10,839,574 B1
(45) Date of Patent: Nov. 17, 2020

(54) SYSTEMS AND METHODS FOR GENERATING CONTENT

(71) Applicant: Facebook, Inc., Menlo Park, CA (US)

(72) Inventors: Jeremy Smallwood, Oak Park, IL (US); Jacob Kyle Bruene, Chicago, IL (US); Tyler Michael Hattery, Park Ridge, IL (US); Kathryn Allen, Chicago, IL (US)

(73) Assignee: Facebook, Inc., Menlo Park, CA (US)

( * ) Notice: Subject to any disclaimer, the term of this patent is extended or adjusted under 35 U.S.C. 154(b) by 131 days.

(21) Appl. No.: 15/917,285

(22) Filed: Mar. 9, 2018

(51) Int. Cl.
*G06T 11/60* (2006.01)
*G06K 9/32* (2006.01)
*G06Q 50/00* (2012.01)

(52) U.S. Cl.
CPC ............ *G06T 11/60* (2013.01); *G06K 9/3241* (2013.01); *G06Q 50/01* (2013.01); *G06T 2207/20132* (2013.01); *G06T 2210/22* (2013.01)

(58) Field of Classification Search
CPC ....... G06T 2207/20132; G06T 2210/22; G06T 11/60; G06K 9/3241; G06Q 50/01
See application file for complete search history.

(56) References Cited

U.S. PATENT DOCUMENTS

| | | | |
|---|---|---|---|
| 8,363,984 B1* | 1/2013 | Goldman | G06T 3/0012 382/298 |
| 2005/0025387 A1* | 2/2005 | Luo | H04N 1/3875 382/298 |
| 2015/0116350 A1* | 4/2015 | Lin | G06T 3/0012 345/620 |
| 2016/0104055 A1* | 4/2016 | Lin | G06T 3/0012 382/298 |
| 2018/0096449 A1* | 4/2018 | Racz | G06T 3/0012 |

FOREIGN PATENT DOCUMENTS

WO   WO-2018106213 A1 *   6/2018   ............. G09G 5/373

* cited by examiner

*Primary Examiner* — Jon Chang
(74) *Attorney, Agent, or Firm* — Sheppard Mullin Richter & Hampton LLP

(57) ABSTRACT

Systems, methods, and non-transitory computer-readable media can receive a source content item. A crop window is automatically determined for the source content item based on framing criteria. A cropped media asset is automatically generated based on the source content item and the crop window. In certain embodiments, an object of interest is automatically identified in the source content item and the crop window is determined based on the object of interest.

20 Claims, 16 Drawing Sheets

Receive a source content item
502

Automatically determine a crop window for the source content item based on framing criteria
504

Generate a cropped media asset based on the source content item and the crop window
506

SYSTEMS AND METHODS FOR GENERATING CONTENT

FIELD OF THE INVENTION

The present technology relates to the field of content generation. More particularly, the present technology relates to techniques for automatically creating and sharing digital content in a computer networking environment.

BACKGROUND

Users often utilize computing devices for a wide variety of purposes. Users can use their computing devices to, for example, interact with one another, access media content, share media content, and create media content. In some cases, media content can be provided by members of a social networking system. The media content can include one or a combination of text, images, videos, and audio. The media content may be published to the social networking system for consumption by others.

SUMMARY

Various embodiments of the present disclosure can include systems, methods, and non-transitory computer readable media configured to receive a source content item. A crop window is automatically determined for the source content item based on framing criteria. A cropped media asset is automatically generated based on the source content item and the crop window.

In an embodiment, an object of interest is automatically identified in the source content item.

In an embodiment, the framing criteria specify one or more preferred positions for the object of interest within the crop window.

In an embodiment, at least a subset of the preferred positions are determined based on the Rule of Thirds.

In an embodiment, the framing criteria specify an aspect ratio for the crop window.

In an embodiment, the source content item has a widescreen aspect ratio.

In an embodiment, the framing criteria specify a vertical aspect ratio for the crop window.

In an embodiment, the framing criteria specify a square aspect ratio for the crop window.

In an embodiment, the framing criteria are determined based on a machine learning model.

In an embodiment, the machine learning model is trained to specify framing criteria based on a likelihood of user interaction.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
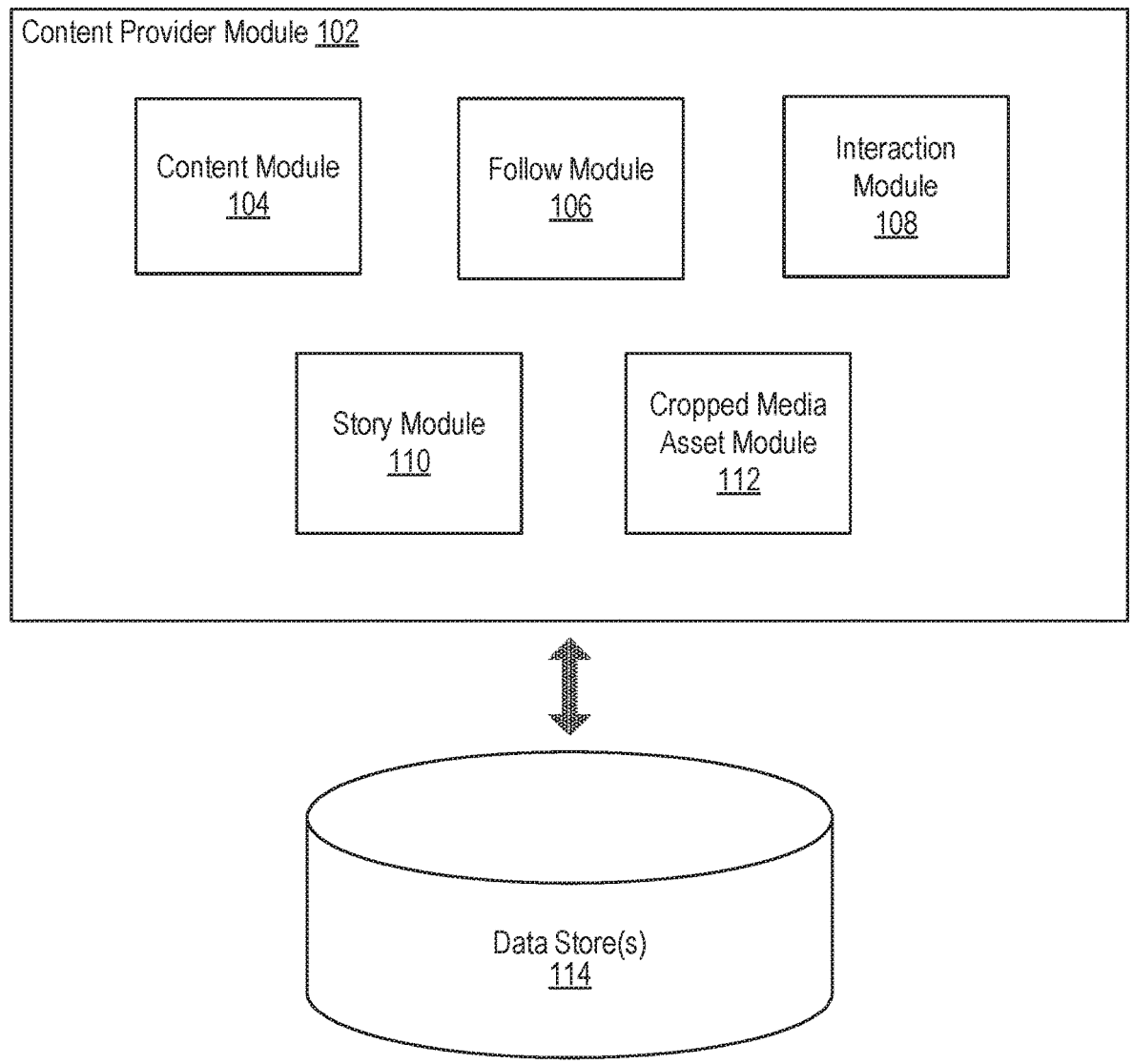
FIG. 1 illustrates an example system including a content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Automatically Generating Content

As mentioned, users often utilize computing devices for a wide variety of purposes. Users can use their computing devices to, for example, interact with one another, access media content, share media content, and create media content. In some cases, media content items can include postings from members of an online community or platform, such as a social networking system. The postings may include one or a combination of text, images, videos, and audio. The postings may be published to the social networking system for consumption by others.

Under conventional approaches, media content items posted by a member can be included in a profile of the member on the social networking system. In other instances, media content items posted by the member can appear in respective content feeds of other users who are members of the social networking system. In certain embodiments, various entities may post media content items that appear in the content feeds of users of a social networking system. For example, advertisers may post advertisements that can appear in users' content feeds. Today, media content captured by content producers is often captured in a widescreen format (i.e., an aspect ratio that is wider than it is tall), such as a 16:9 aspect ratio. This may be done, for example, in order to accommodate certain viewing devices such as televisions or movie theater screens. However, many users access social networking systems on a mobile device, which may display content most naturally in a vertical aspect ratio (i.e., an aspect ratio that is taller than it is wide). This can lead to a problematic scenario in which media content captured by a content producer is not optimally suited for viewing on a mobile device display. As such, users and/or content producers may find it difficult or burdensome to generate content that is suited for viewing on a mobile device display, particularly when the original source content is shot in a widescreen format that is not optimally suited for display on a mobile device.

An improved approach rooted in computer technology overcomes the foregoing and other disadvantages associated with conventional approaches specifically arising in the realm of computer technology. In general, a cropped media asset can be automatically generated from one or more source content items. For example, a source content item may be a video, such as a movie or television broadcast, and a cropped media asset can be automatically generated from the source video. In the example of a movie being the source content item, the cropped media assets may be shorter video clips from the movie that, for example, can be used to advertise the movie on a social networking system. Each cropped media asset may be a cropped version of a source content item, such that the cropped media asset shows only a portion of visual content contained in the source content item. Furthermore, in various embodiments, a cropped media asset may be cropped in such a way that the cropped media asset has a different aspect ratio from the source content item. For example, a source video may have a widescreen 16:9 aspect ratio, while a cropped media asset generated from the source video can have a square 1:1 aspect ratio, a 2:3 aspect ratio, or a 9:16 aspect ratio. In certain embodiments, cropped media assets may be automatically generated based on objects that are automatically detected in one or more source content items. For example, a source content item may be a movie starring a particular actor, and one or more cropped media assets can be generated using scenes in which the actor is detected. Or in another example, a source content item may be a video of a sporting event, and a cropped media asset can be generated which includes plays featuring a particular athlete participating in the sporting event. More details relating to the disclosed technology are provided below.

FIG. 1 illustrates an example system 100 including a content provider module 102, according to an embodiment of the present disclosure. The content provider module 102 can automatically generate a cropped media asset from one or more source content items. The content provider module 102 can receive one or more source content items. In various embodiments, the content provider module 102 can automatically identify one or more objects of interest within the one or more source content items. For example, an object of interest may be a particular person or a particular product or other object. The content provider module 102 can automatically generate cropped media assets based on the automatic identification of the one or more objects of interest. In various embodiments, in automatically generating a cropped media asset, the content provider module 102 can automatically determine various visual presentation characteristics for the cropped media asset. For example, the content provider module 102 can determine a crop window to be used to create a cropped media asset. A crop window can define a portion of a source content item to be used to create a cropped media asset. In various embodiments, the content provider module 102 can provide a cropped media asset to a user (e.g., for posting to a social networking system), or can automatically publish the cropped media asset (e.g., to a social networking system).

As shown in the example of FIG. 1, the content provider module 102 can include a content module 104, a follow module 106, an interaction module 108, a story module 110, and a cropped media asset module 112. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provider module 102 can be implemented in any suitable combinations.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be, in part or in whole, implemented as software running on one or more computing devices or systems, such as on a server system or a client computing device. In some instances, the content provider module 102 can be, in part or in whole, implemented within or configured to operate in conjunction with or be integrated with a social networking system (or service), such as a social networking system 630 of FIG. 6. Likewise, in some instances, the content provider module 102 can be, in part or in whole, implemented within or configured to operate in conjunction with or be integrated with a client computing device, such as the user device 610 of FIG. 6. For example, the content provider module 102 can be implemented as or within a dedicated application (e.g., app), a program, or an applet running on a user computing device or client computing system. The application incorporating or implementing instructions for performing functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 114 can store information that is utilized by the content provider module 102. For example, the data store 114 can store one or more source content items, one or more cropped media assets, one or more rules, criteria, or models for automatically generating cropped media assets, and the like. It is contemplated that there can be many variations or other possibilities.

The content module 104 can be configured to provide users with access to content (e.g., media content items, such as source content items or cropped media assets) that is available through a social networking system. In some instances, this content can include media content items that are posted in content feeds accessible through the social networking system. For example, the content module 104 can provide a first user with access to media content items through an interface that is provided by a software application (e.g., a social networking application) running on a computing device of the first user. The first user can also interact with the interface to post media content items to the social networking system. Such media content items may include text, images, audio, and videos, to name some examples. For example, the first user can submit a content post to be published through the social networking system. The content post may be (or include), for example, a cropped media asset or a source content item. In some embodiments, the content post can include, or reference, one or more media content items.

In various embodiments, other users of a social networking system can access media content items posted by a first user. In one example, the other users can access the media content items by searching for the first user by user name through an interface provided by a software application (e.g., a social networking application, browser, etc.) running on their respective computing devices. In some instances, some users may want to see media content items posted by the first user in their respective content feed. To cause media content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all media content items that are posted by the first user can automatically be included in the respective content feed of the user. If the user decides that they no longer want to see content from the first user in their respective content feed, the user can select an option through the interface to unsubscribe from, or "unfollow", the first user. As a result, the follow module 106 can remove the association between the user and the first user so that media content items posted by the first user are no longer included in the content feed of the user. Users of a social networking system can also include entities that are represented and/or active on a social networking system. In certain embodiments, content posts can include advertisements or other content posts generated by entities that are active on the social networking system. In certain embodiments, a user may be presented with content posts posted by entities which the user follows or is subscribed to. In certain embodiments, a user may be presented with advertisements or other content posts in a content feed associated with the user.

In some instances, users may want to interact with posted media content items. For example, a user may want to endorse, or "like", a media content item. In this example, the user can select an option provided in the interface to like the desired media content item. The interaction module 108 can determine when a user likes a given media content item and can store information describing this relationship. The interaction module 108 can also determine when other forms of user interaction are performed and can store information describing the interaction (e.g., information describing the type of interaction, the identity of the user, the identity of the user that posted the media content item, and the media content item, to name some examples). For example, the user may want to post a comment in response to a media content item. In this example, the user can select an option provided in the interface to enter and post the comment for the desired media content item. The interaction module 108 can determine when a user posts a comment in response to a given media content item and can store information describing this relationship. Other forms of user interaction can include emoji-based reactions to a media content item (e.g., selecting an option that corresponds to a particular reaction emoji, e.g., happy, sad, angry, etc.) and re-sharing a media content item, for example.

In some embodiments, the story module 110 can provide an option that allows users to post their content as stories. In such embodiments, each user has a corresponding story feed in which the user can post content. When a user's story feed is accessed by another user, the story module 110 can provide content posted in the story feed to the other user for viewing. In certain embodiments, when a user views a particular user's story feed, the user may also be presented with advertisements or other content posts posted by other entities on the social networking system or by the social networking system itself. In general, content posted in a user's story feed may be accessible by any user of the social networking system. In some embodiments, content posted in a user's story feed may only be accessible to followers of the user. In some embodiments, user stories expire after a pre-defined time interval (e.g., after 24 hours). In such embodiments, content posted as a story in a story feed is treated as ephemeral content that is made inaccessible once the pre-defined time interval has elapsed. In contrast, content posted in a user (or follower) primary content feed can be treated as non-ephemeral content that remains accessible for a longer and/or an indefinite period of time.

In various embodiments, the cropped media asset module 112 can automatically generate a cropped media asset based on one or more source content items. A cropped media asset created by the cropped media asset module 112 can comprise a portion of a source content item. For example, if a source content item is a movie, a cropped media asset can comprise a three to ten second clip from the movie. Furthermore, a cropped media asset may be a cropped version of a source content item or a cropped version of a portion of a source content item. For example, returning to the example of a source content item that is a movie, a cropped media asset may be a cropped version of a three to ten second clip from the movie. In certain embodiments, the cropped media asset module 112 can generate a cropped media asset based on automatic identification of one or more objects of interest in a source content item. For example, if a source content item is a movie, a cropped media asset may be a five second clip of the movie in which a particular actor (i.e., the object of interest) is shown, and the cropped media asset may crop the visual content from the five second clip such that the actor is featured in the cropped media asset. A cropped media asset can have different visual presentation characteristics from the source content item. For example, the cropped media asset may comprise a different aspect ratio from the source content item, a different zoom level from the source content item, may crop certain content out from the source content item, and the like. In certain embodiments, a cropped media asset can include content from multiple source content items. For example, the cropped media asset can include video clips from multiple source videos. A cropped media asset may be any media content item that can be generated from one or more source content items, including, but not limited to, a still image, a video clip, a moving image (e.g., a GIF), and the like. More details regarding the cropped media asset module 112 will be provided below with reference to FIG. 2.

Figure 2:
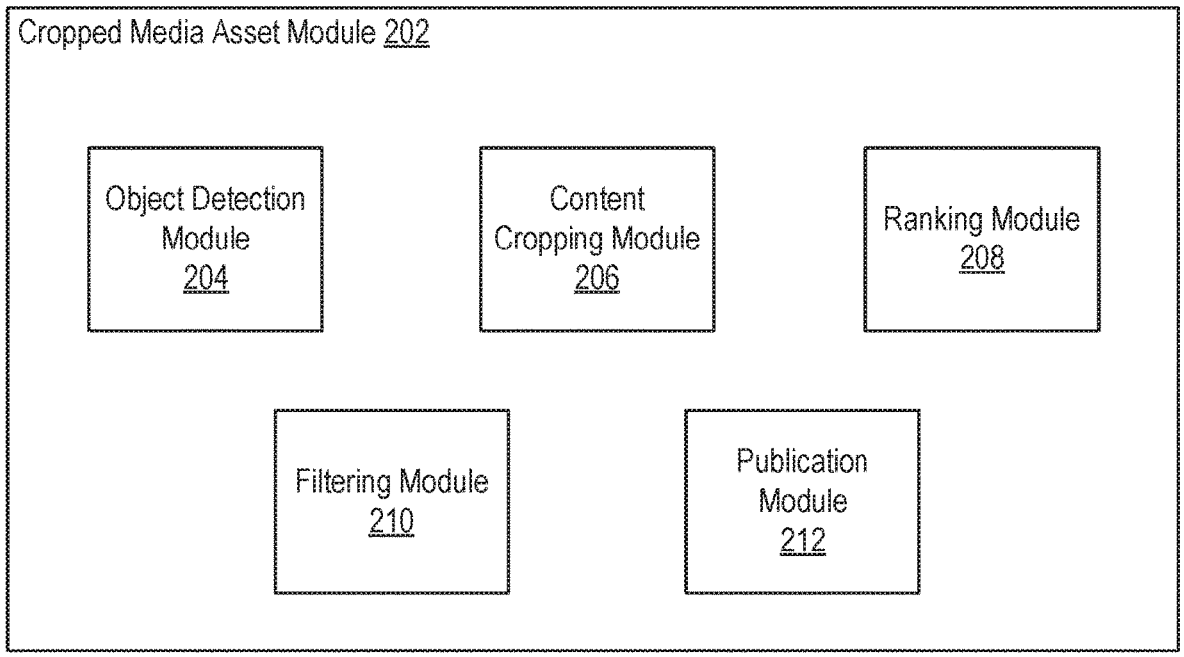
FIG. 2 illustrates an example cropped media asset module, according to an embodiment of the present disclosure.

FIG. 2 illustrates an example cropped media asset module 202 configured to automatically generate a cropped media asset based on one or more source content items, according to an embodiment of the present disclosure. In some embodiments, the cropped media asset module 112 of FIG. 1 can be implemented as the cropped media asset module 202. As shown in the example of FIG. 2, the cropped media asset module 202 can include an object detection module 204, a content cropping module 206, a ranking module 208, a filtering module 210, and a publication module 212.

The object detection module 204 can be configured to automatically identify one or more objects of interest in a source content item. The object detection module 204 can receive an input of one or more objects of interest to be detected in a source content item. The one or more objects of interest may, for example, be provided by a user providing a source content item. An object of interest can include any object that can be automatically identified. For example, an object of interest can be a particular person, and the object detection module 204 can identify any portions of a source content item in which the person is depicted. In another example, an object of interest can be a particular product, and the object detection module 204 can automatically identify any portions of a source content item in which the product is depicted. The object detection module 204 can perform automatic identification of objects in one or more portions (e.g., image frames) of a source content item based on any suitable conventional computerized image analysis techniques. For example, a particular person or other particular object may be identified based on automated facial or object recognition techniques based on a machine learning model (e.g., convolutional neural network) that has been trained to identify the particular person or the particular object.

The content cropping module 206 can be configured to crop one or more source content items to generate cropped media assets. In various embodiments, the content cropping module 206 can automatically determine a crop window for generating a cropped media asset. Any visual content contained within the crop window is selected for potential inclusion in a cropped media asset, while any visual content outside of the crop window is "cropped" out, and not included in a cropped media asset. In certain embodiments, the content cropping module 206 can crop a source content item based on one or more objects of interest identified by the object detection module 204. For example, if an object of interest is identified in a particular portion of a source content item, a crop window can be automatically determined which includes and/or features the object of interest during that portion. In certain embodiments, if a plurality of objects of interest are identified in a particular portion of a source content item, the crop window can be defined such that all of the objects of interest are included within the crop window during that portion.

In various embodiment, the content cropping module 206 can automatically determine a crop window based on framing criteria. Framing criteria can be utilized to determine any visual aspects of a crop window, such as the size of a crop window, an aspect ratio of a crop window, positioning of a crop window, positioning of particular objects within the crop window, movement of the crop window (e.g., whether the crop window should stay still, or follow an object), zooming of the crop window (e.g., whether the crop window should stay at a constant size/zoom level, or whether the crop window should zoom in or out), and the like. In certain embodiments, framing criteria can specify a desired aspect ratio. For example, if a cropped media asset is to have a 1:1 aspect ratio, the crop window will also have a 1:1 aspect ratio, or if the cropped media asset is to have a 2:3 aspect ratio, the crop window will also have a 2:3 aspect ratio. It should be understood that any aspect ratio is possible, including, but not limited to, 1:1, 2:3, 3:4, 5:7, 9:16, and the like.

In various embodiments, framing criteria may include criteria implemented in order to feature one or more objects of interest in a cropped media asset. In certain embodiments, framing criteria may specify one or more preferred positions for an object of interest within a crop window. For example, framing criteria may specify that an object of interest should, if possible, be positioned within a cropped media asset according to the Rule of Thirds. In another example, framing criteria may specify that an object of interest should be centered in a cropped media asset.

In certain embodiments, framing criteria can specify changes to a crop window over time. For example, framing criteria may specify that the crop window should change in size over time, such as by transitioning from a larger crop window to a smaller crop window in order to zoom in on an object of interest, or from a smaller window to a larger window to zoom out. In yet another example, framing criteria may specify that a crop window should change position, for example, to move with an object as the object movies within a window of the source content item, or may specify that a crop window should stay still relative to the window of the source content item, even as the object moves within the window of the source content item, and allow the object to move within the crop window. Being provided with the position of an object of interest and a desired aspect ratio, the content cropping module 206 can determine a zoom level, a position of a crop window, and any movements of the crop window that satisfy the framing criteria.

In certain embodiments, framing criteria may be determined based on a machine learning model. For example, a machine learning model can be trained using training data comprising a set of media content items and user interaction information for the set of media content items. Based on the user interaction information, the machine learning model can identify which media content items were most successful in receiving user interaction (e.g., a highest number of likes, comments, shares, or clicks; a high conversion ratio; etc.). Furthermore, the machine learning model can be trained in order to identify various features of the media content items that are indicative of success. For example, it can be determined that media content items that are of a particular length (e.g., video clips of less than 5 seconds) tend to be more successful, or media content items that track and follow an object of interest tend to be more successful than media content items that are still and have an object of interest move through the frame, or that media content items that place an object of interest at a lower left third of a media content item tends to be more successful than media content items that place an object of interest in an upper right third, and the like. In this way, a machine learning model can be trained to determine framing criteria that can be used by the content cropping module 206 to determine a crop window for generating a cropped media asset that maximizes a likelihood of user interaction with the cropped media asset.

In certain embodiments, the framing criteria can specify a maximum zoom threshold. The maximum zoom threshold may also be a minimum resolution threshold. This may be useful, for example, if an object of interest occupies a very small portion of an image or video frame. The framing criteria may specify that the content cropping module 206 cannot crop so much of the source content item that the resulting cropped media asset has a resolution that falls below a minimum resolution threshold. In other words, the framing criteria may specify that a crop window must be sufficiently large such that it will result in a cropped media asset satisfying the minimum resolution threshold.

In certain embodiments, automatic definition of a crop window and cropping of a source content item may be performed in real-time (or near real-time) as a user views a source content item. For example, if a user is viewing a television broadcast of a sporting event, the user may be provided with the option to identify a particular athlete in the sporting event. The content cropping module 206 can be configured to define a crop window and crop the source content item in real-time such that the user can view a modified broadcast which stays with and focuses on the particular athlete. Similarly, if a user is viewing a movie, the user can select a particular character or actor as an object of interest, and the content cropping module 206 can define a crop window and crop the source content item in real-time such that the user can view a modified version of the movie in which the user follows the character/actor within in each scene.

In addition to visually cropping source content items, the content cropping module 206 can also be configured to temporally crop source content items to generate cropped media assets. For example, temporal cropping of a source content item can comprise determining a duration for a cropped media asset. In certain embodiments, the duration of a cropped media asset may be determined based on the machine learning model described above (e.g., a duration determined in order to maximize the potential for user interaction with a cropped media asset). The duration of a cropped media asset may also be determined based on a length of time an object of interest is depicted in a particular portion of a source content item.

The ranking module 208 can be configured to rank a set of cropped media assets based on ranking criteria. The filtering module 210 can be configured to filter a set of cropped media assets based on filtering criteria. In certain instances, a source content item may be capable of producing a very large number of cropped media assets. For example, a particular movie may have many clips in which an actor is shown, or a sporting event broadcast may have many video clips in which a particular athlete is shown. In such scenarios, it may not be desirable to provide a user with a very large set of cropped media assets, and it may be preferable to provide the user with a smaller subset of the possible cropped media assets. To this end, the ranking module 208 can rank a set of cropped media assets based on ranking criteria, and the filtering module 210 can filter out or remove any cropped media assets that do not satisfy filtering criteria. The filtering criteria may include, for example, a ranking threshold such that cropped media assets that do not satisfy a ranking threshold are filtered out.

The ranking criteria may, in various embodiments, rank a set of cropped media assets based on a quality determination for each cropped media asset. In certain embodiments, the set of ranking criteria may be implemented based on a machine learning model. As discussed above, a machine learning model can be trained based on a set of training data to identify various characteristics of a media content item that result in a higher likelihood of receiving user interaction. A set of cropped media assets can be ranked based on likelihood of each cropped media asset to receive user interaction. In certain embodiments, the ranking criteria may uprank cropped media assets that depict an object of interest in the foreground, and downrank cropped media assets that depict an object of interest in the background, or downrank cropped media assets that have an obscured or partial view of an object of interest.

The publication module 212 can be configured to post (i.e., publish) media content items, such as cropped media assets, to, for example, a social networking system. In certain embodiments, the publication module 212 can provide a set of cropped media assets to a user for the user to modify and/or publish. In certain embodiments, the set of cropped media assets provided to a user can include those cropped media assets that satisfy the filtering criteria implemented by the filtering module 210.

In some embodiments, users have an option to share media content items as stories in a story feed or in one or more other content feeds. In some embodiments, content included in a user's story feed is treated as ephemeral content. That is, content included in the story feed can be available to other users (e.g., followers of the user) for a limited duration of time, i.e., the content is temporarily available. In some embodiments, content included in other content feeds may be treated as non-ephemeral content. That is, the content can be available to the other users for some longer or indefinite duration of time. These time periods can be pre-defined by the social networking system or, in some embodiments, by the user posting the media content item. In some embodiments, a media content item posted in a non-ephemeral content feed can be available through the social networking system until the media content item is deleted by the user. In various embodiments, a user can publish a cropped media asset to his or her story feed or to one or more other non-ephemeral content feeds. The cropped media asset module 202, and various functions thereof, will now be described with reference to various example scenarios.

Figure 3A:
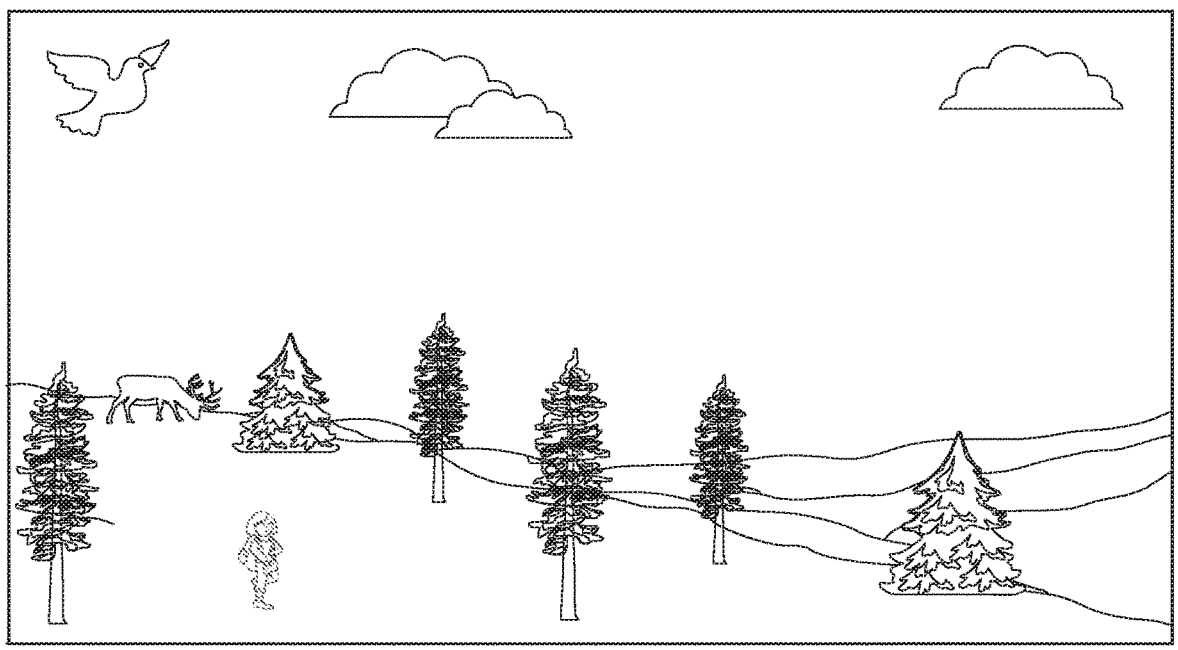
FIGS. 3A-3E illustrate an example scenario associated with automatically generating a cropped media asset, according to an embodiment of the present disclosure.
Figure 3B:
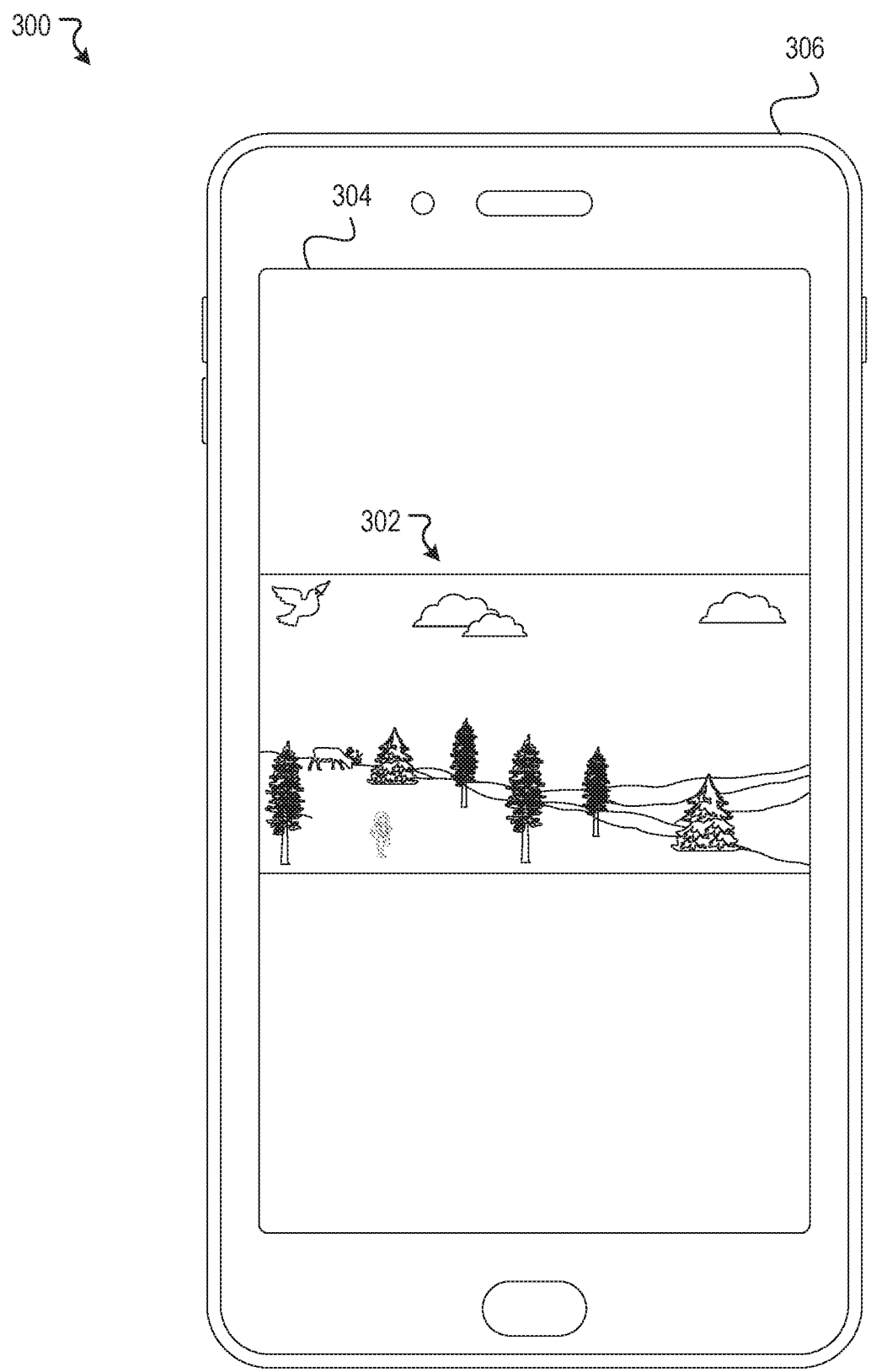

FIGS. 3A-3E illustrate an example scenario 300 associated with automatic generation of cropped media assets, according to an embodiment of the present disclosure. In FIG. 3A, the example scenario 300 includes a source content item 302. The source content item 302 may be a still image, or a single frame from a video. The source content item 302 is in a widescreen format with a 16:9 aspect ratio. FIG. 3B illustrates the source content item 302 displayed in an interface 304 that is presented through a display screen of a computing device 306. In various embodiments, the interface 304 may be provided through an application (e.g., a web browser, a social networking application, messenger application, etc.) running on the computing device 306 that is configured to interact with a social networking system. As can be seen in FIG. 3B, the source content item 302, having a wide 16:9 aspect ratio, is not optimally displayed on the computing device 306.

Figure 3C:
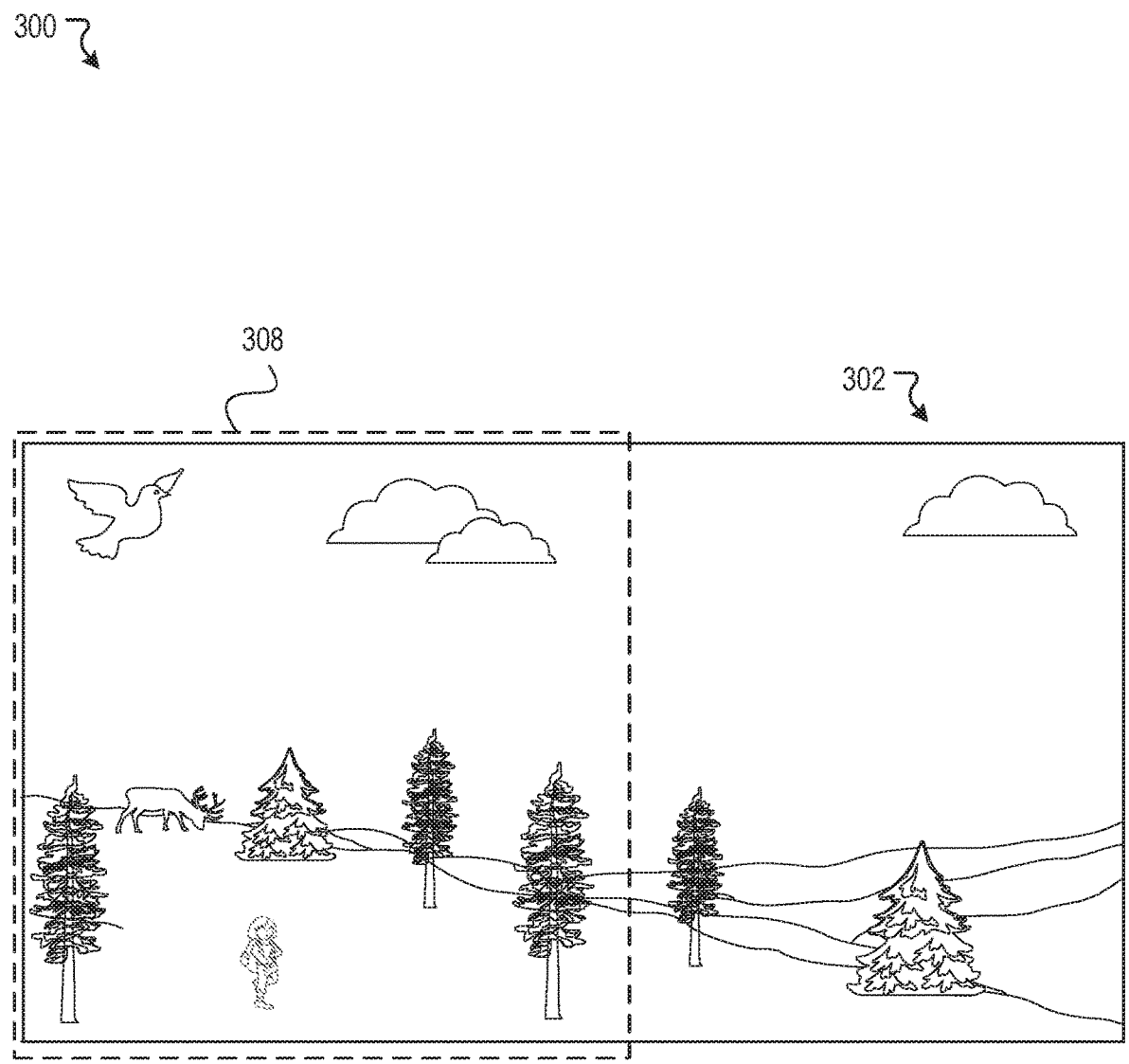
Figure 3D:
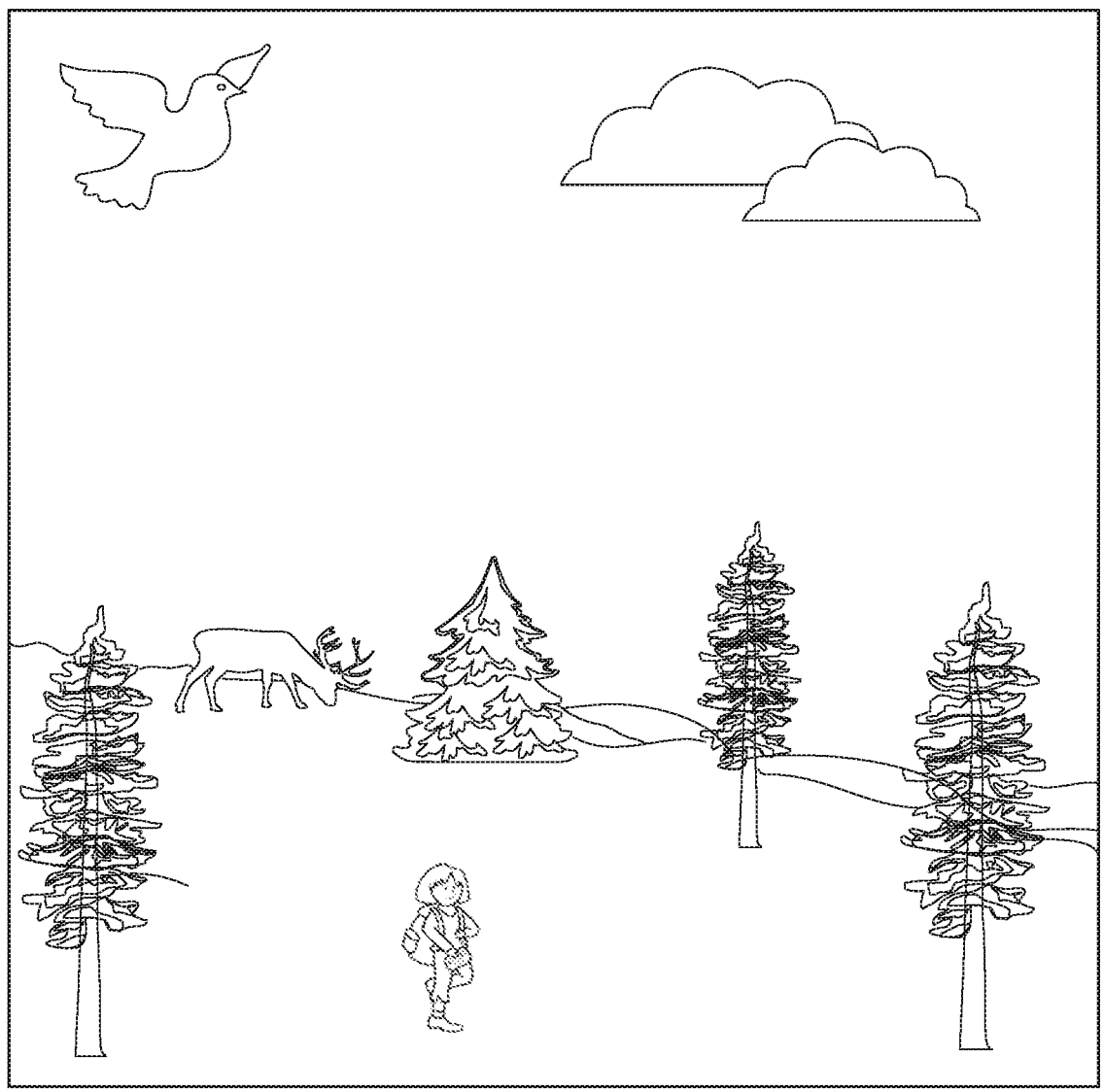

In FIG. 3C, a crop window 308 has been determined for the source content item 302. For example, the crop window 308 can be automatically defined by the cropped media asset module 202 based on framing criteria. The crop window 308 defines a portion of the source content item 302 to be used for generating a cropped media asset. The crop window 308 has a 1:1 aspect ratio. FIG. 3D depicts a cropped media asset 310 that has been generated, for example, by the cropped media asset module 202. The cropped media asset 310 includes the visual portions of the source content item 302 that were included in the crop window 308, and excludes visual portions that were not included in the crop window

Figure 3E:
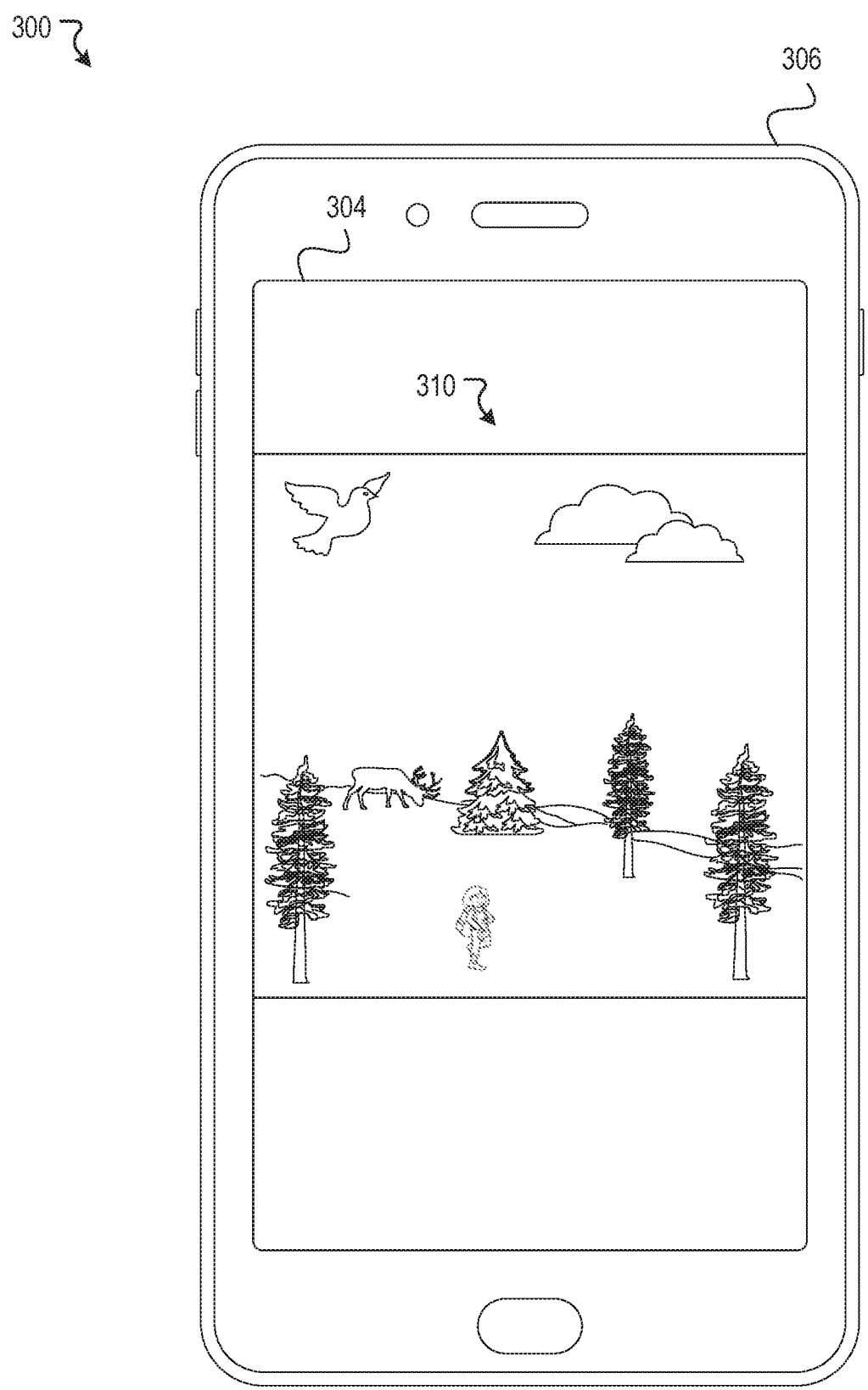

308. FIG. 3E depicts the cropped media asset 310 being displayed on the computing device 306.

Figure 4A:
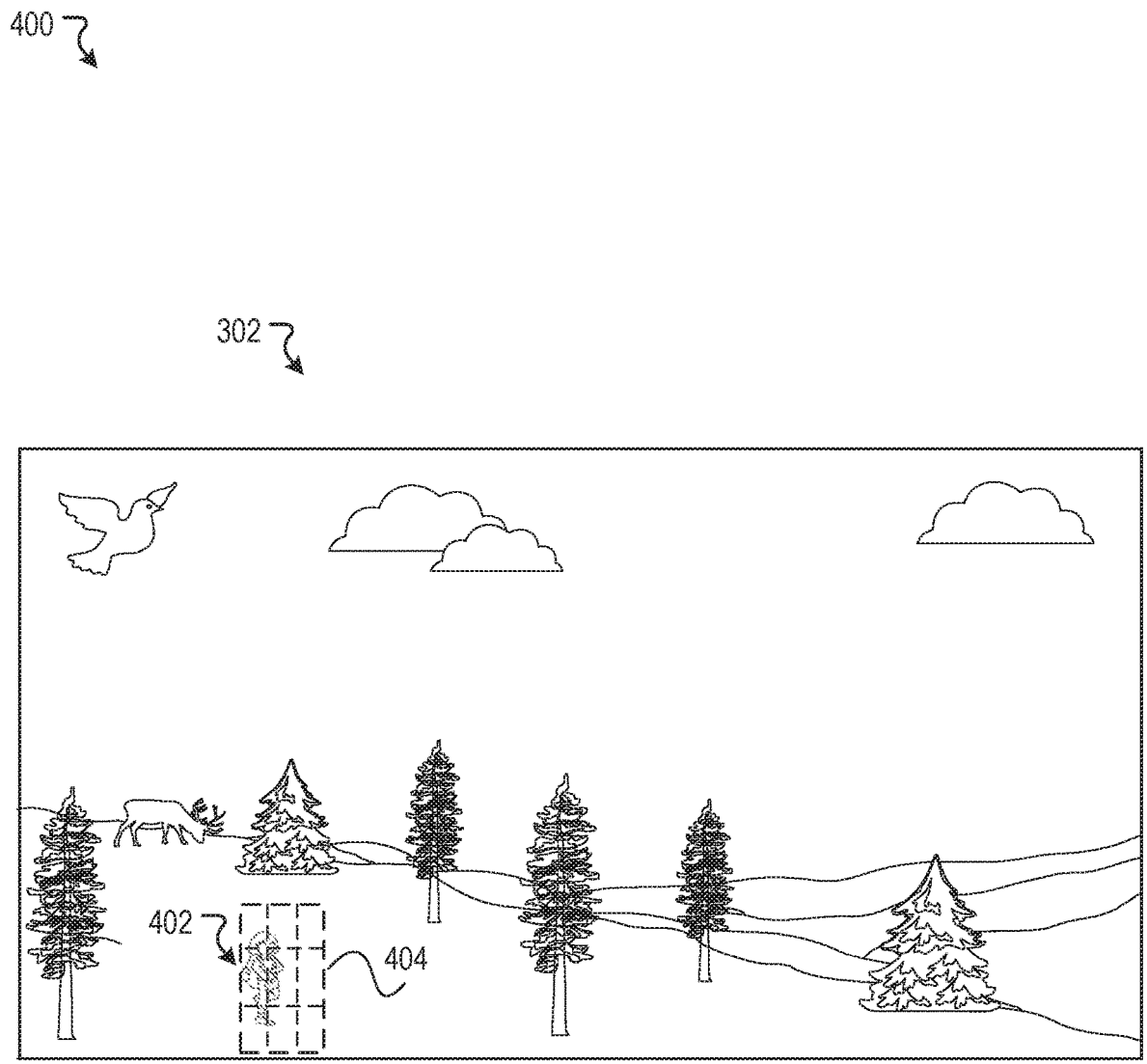
FIGS. 4A-4F illustrate example scenarios associated with automatically generating cropped media assets, according to various embodiments of the present disclosure.
Figure 4B:
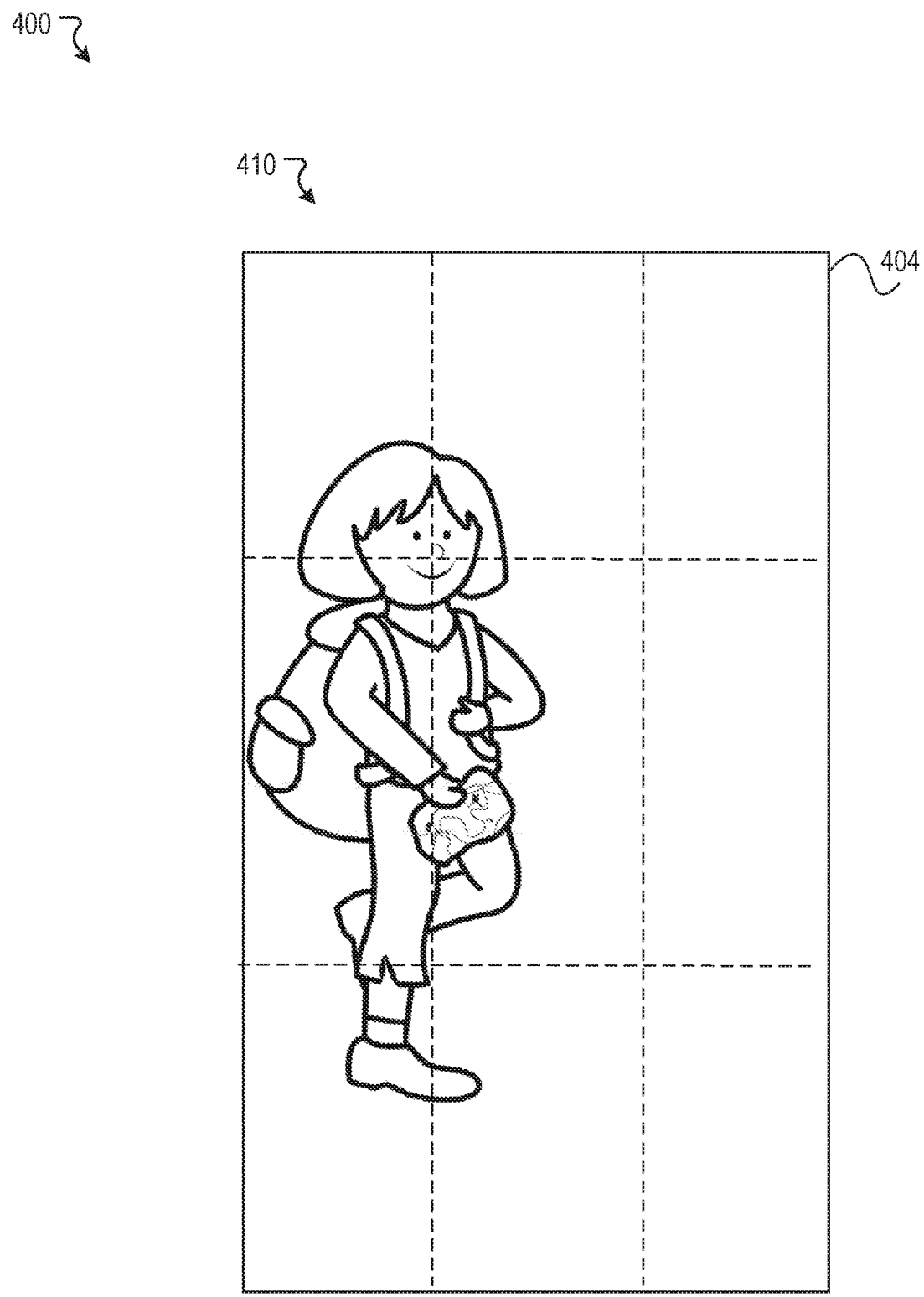
Figure 4C:
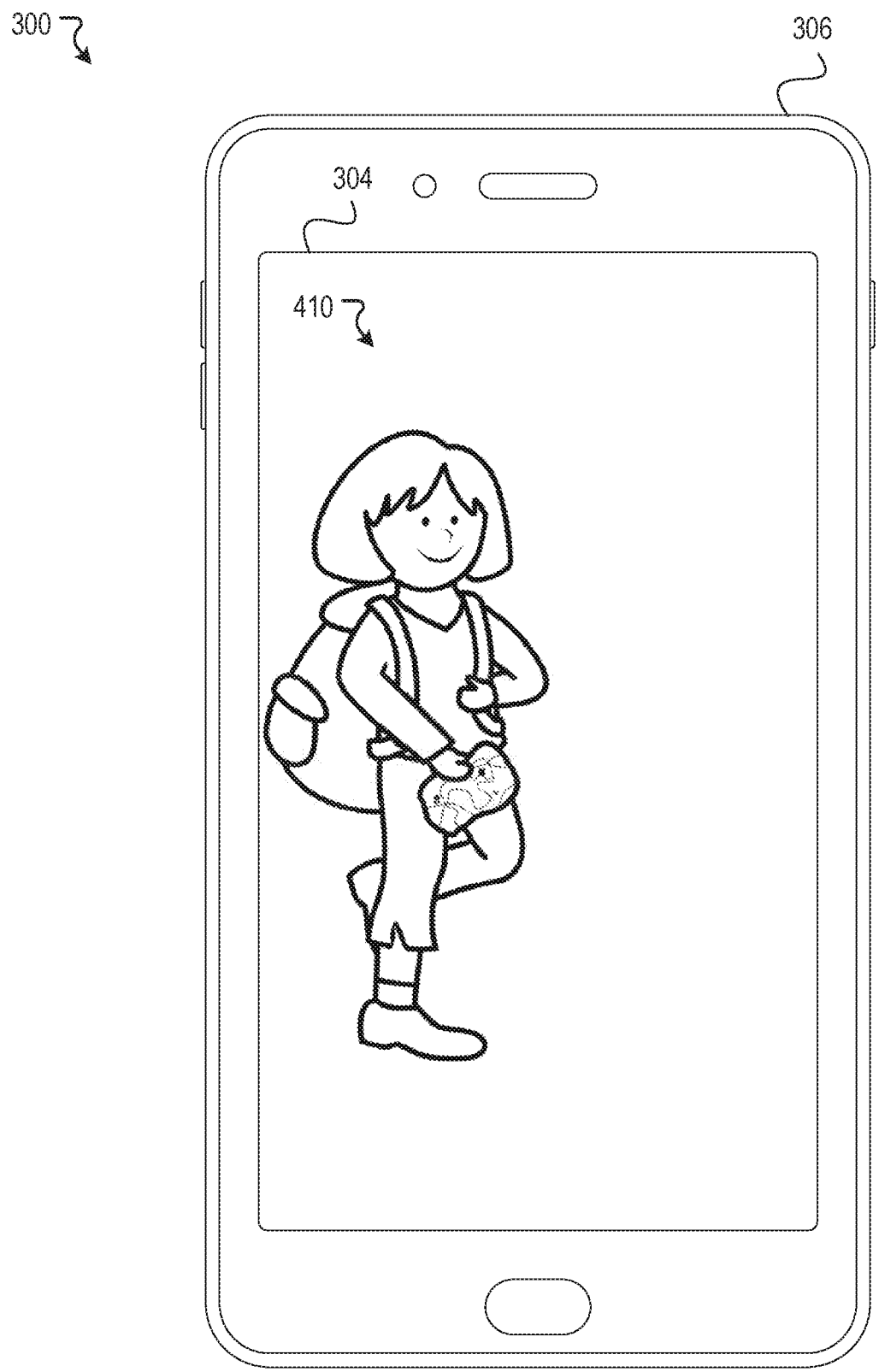

FIGS. 4A-4C illustrate an example scenario 400 associated with automatic generation of cropped media assets, according to an embodiment of the present disclosure. The example scenario 400 includes the source content item 302 of FIG. 3A. The example scenario 400 demonstrates automatic generation of cropped media assets based on framing criteria. In FIGS. 3A-3E, a cropped media asset having an aspect ratio of 1:1 was demonstrated. In the example scenario 400, the framing criteria specify an aspect ratio of 9:16. Furthermore, a person 402 is identified as an object of interest, and the framing criteria specify that the object of interest should preferably be positioned at a top left corner of a crop window according to the Rule of Thirds. In FIG. 4A, a crop window 404 has been defined (e.g., by the cropped media asset module 202). The crop window 404 has been defined such that it satisfies the framing criteria, i.e., the object of interest (person 402) has been positioned at an upper left corner of the crop window 404 according to the Rule of Thirds. In the example scenario 400, the size and positioning of the crop window 404 has been constrained and defined, at least in part, by the framing criteria. For example, placement of the person 402 in an upper left corner of the crop window 404 constrains the size of the crop window 404, due to the fact that the crop window 404 cannot extend beyond a lower bound of the source content item 302. FIG. 4B depicts a cropped media asset 410 that has been generated based on the crop window 404. FIG. 4C depicts the cropped media asset 410 displayed on the computing device 306.

Figure 4D:
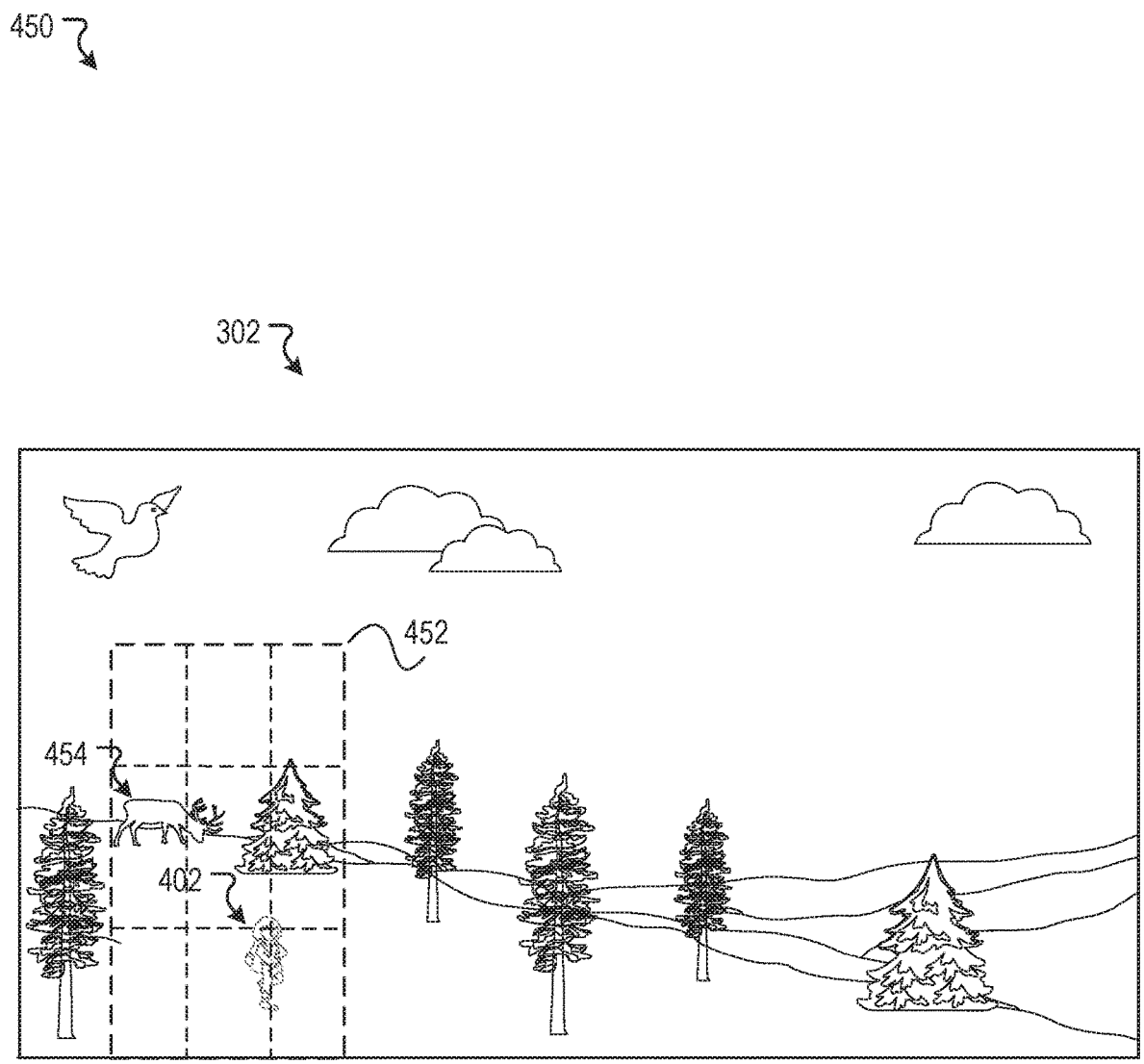
Figure 4E:
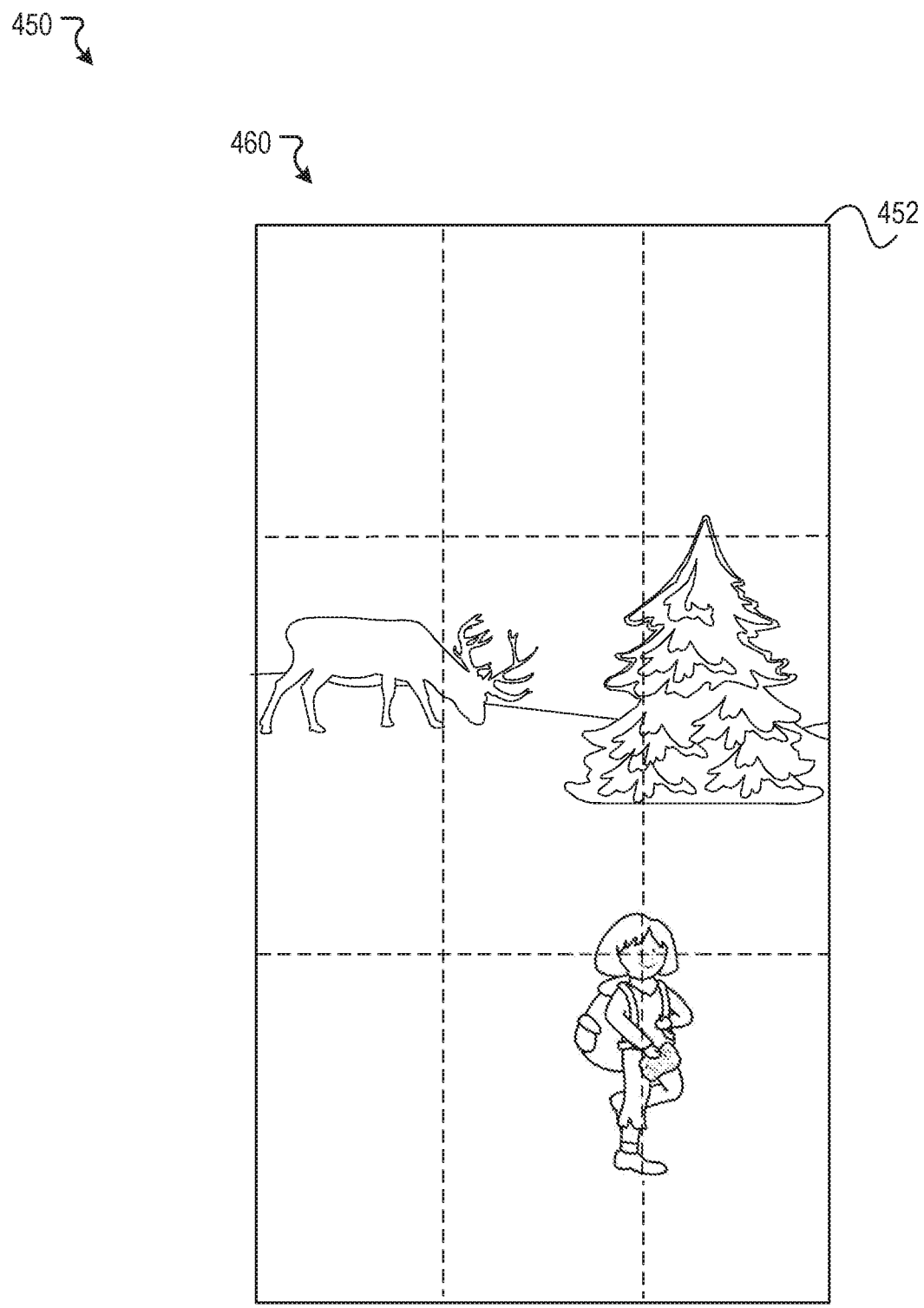
Figure 4F:

FIG. 4D-4F illustrate an example scenario 450 associated with automatic generation of cropped media assets, according to an embodiment of the present disclosure. The example scenario 450 is similar to the example scenario 400. However, rather than the framing criteria specifying a preference for positioning the object of interest at an upper left corner of a crop window, the framing criteria in example scenario 450 specify a preference for positioning the object of interest at a lower right corner of a crop window. In FIG. 4D, the person 402 (i.e., the object of interest) has been positioned at a lower right corner of a crop window 452. Furthermore, in the example scenario 450, a reindeer 454 has also been identified as a secondary object of interest, such that the size of the crop window 452 is defined so as to include both the person 402 and the reindeer 454. The size and positioning of the crop window 452 differs from the crop window 404 as a result of the changes to the framing criteria from example scenario 400 to example scenario 450. FIG. 4E depicts a cropped media asset 460 that has been generated based on the crop window 452. FIG. 4F depicts the cropped media asset 460 displayed on the computing device 306. It should be understood that, while the crop windows shown in the example scenarios appear to be stationary crop windows of a constant size, that does not necessarily have to be the case. For example, if the source content item is a video, the crop window may change position and sizes from frame to frame based on framing criteria. For example, in one example scenario, the crop window 404 of FIG. 4A may gradually increase in size and adjust position such that over the course of a few frames, the crop window 404 transitions to become the crop window 452 of FIG. 4D.

Figure 5:
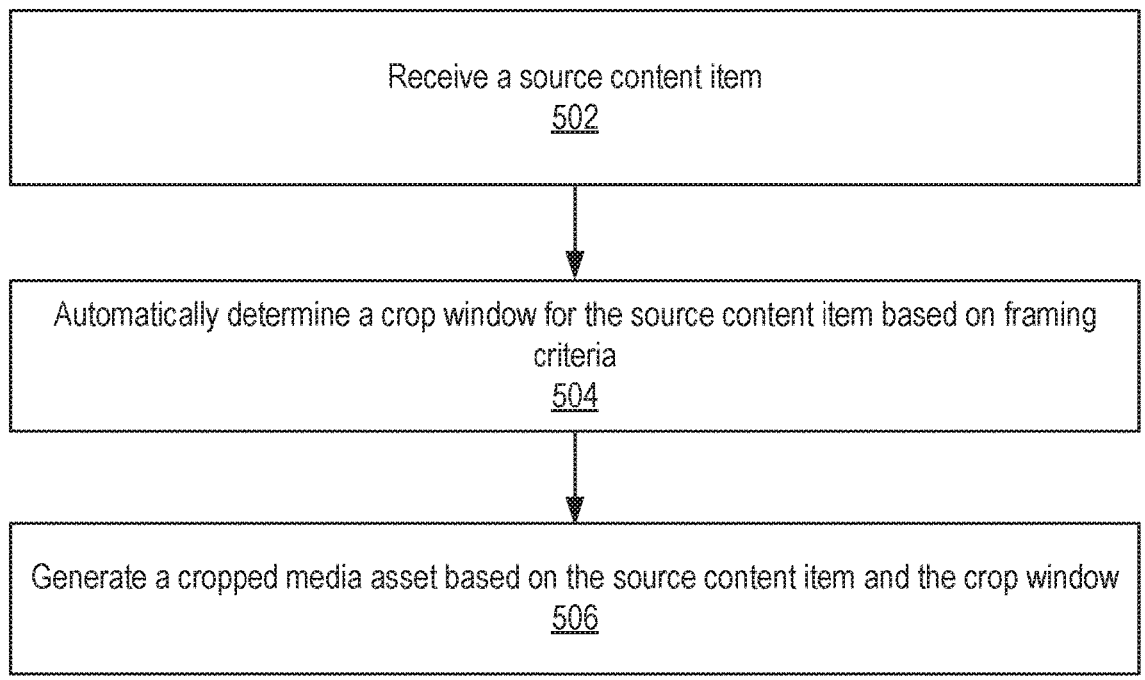
FIG. 5 illustrates an example method associated with automatically generating cropped media assets, according to an embodiment of the present disclosure.

FIG. 5 illustrates an example method 500 associated with automated generation of cropped media assets, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive a source content item. At block 504, the example method 500 can automatically determine a crop window for the source content item based on framing criteria. At block 506, the example method 500 can generate a cropped media asset based on the source content item and the crop window.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
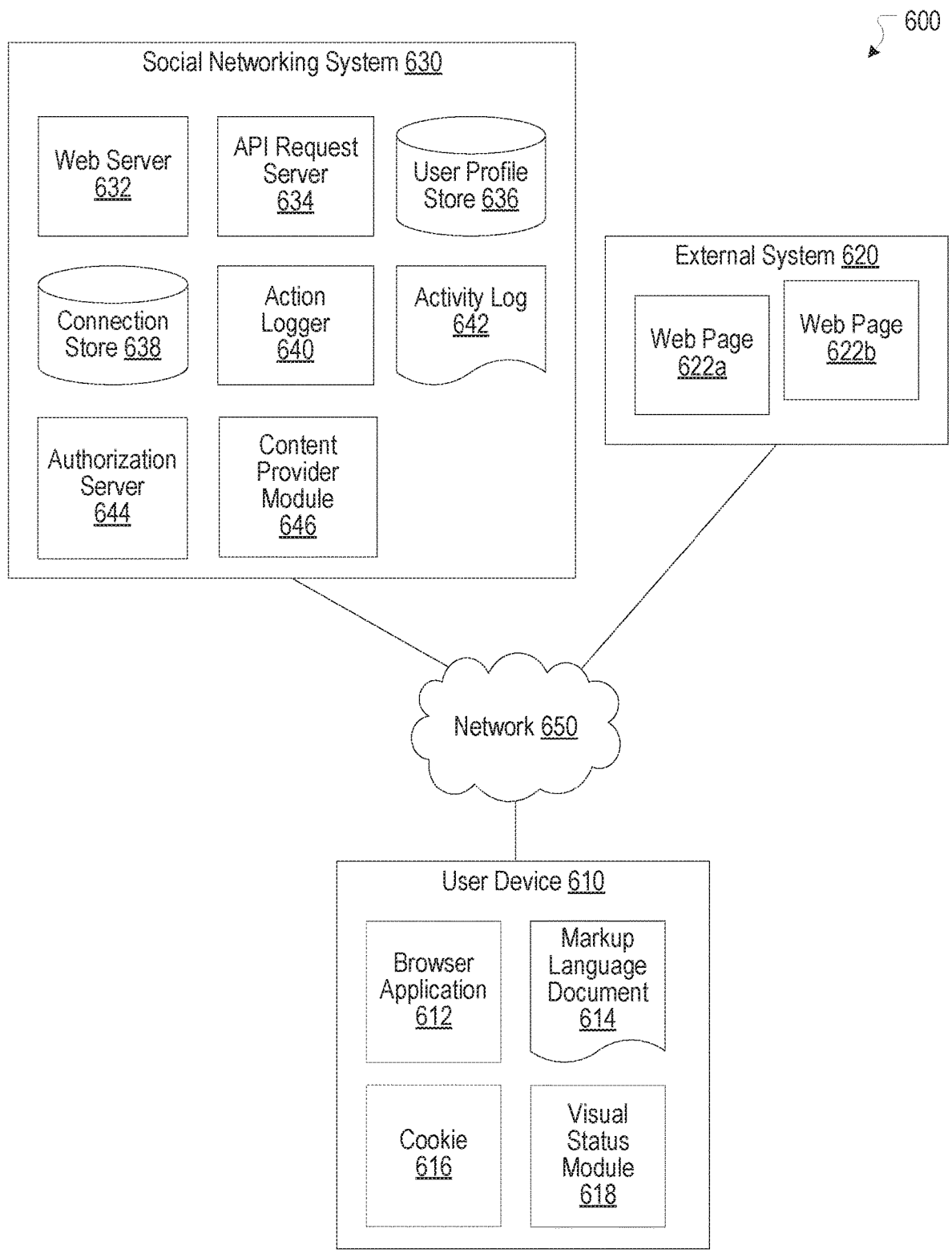
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102, as discussed in more detail herein. As discussed previously, it should be appreciated that there can be many variations or other possibilities. For example, in some embodiments, one or more functionalities of the content provider module 646 can be implemented in the user device 610. For example, the user device 610 can include a visual status module 618. The visual status module 618 can, for example, be implemented as the visual status module 112, as discussed in more detail herein. As discussed previously, it should be appreciated that there can be many variations or other possibilities.

Hardware Implementation

Figure 7:
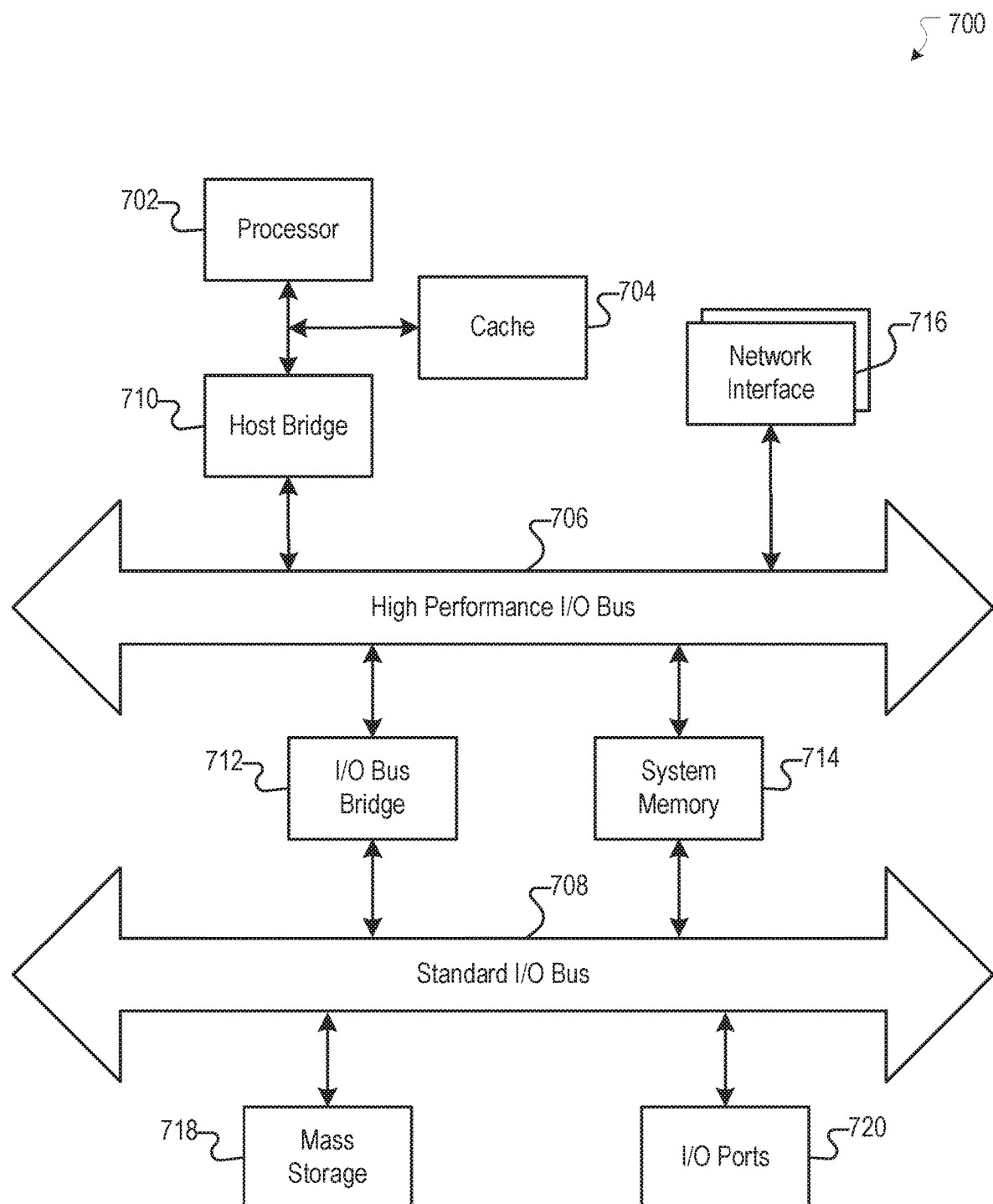
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a source content item;
   identifying, by the computing system, an object in the source content item;
   determining, by the computing system, a crop window for the source content item based on framing criteria, wherein the framing criteria specify a plurality of changes to the crop window to feature the object within the crop window, and the plurality of changes includes a change to at least a size or a position of the crop window with respect to the source content item so that a location of the object within the crop window is unchanged; and
   generating, by the computing system, a plurality of cropped media assets from the source content item based on the crop window;
   ranking, by the computing system, the plurality of cropped media assets based on a likelihood of receiving a user interaction; and
   based on the ranking, providing, by the computing system, at least one cropped media asset from the plurality of cropped media assets for publication.

2. The computer-implemented method of claim 1, wherein the framing criteria specify one or more preferred positions for the object within the crop window.

3. The computer-implemented method of claim 2, wherein at least a subset of the preferred positions is determined based on the Rule of Thirds.

4. The computer-implemented method of claim 1, wherein the framing criteria specify an aspect ratio for the crop window.

5. The computer-implemented method of claim 4, wherein the source content item has a widescreen aspect ratio.

6. The computer-implemented method of claim 5, wherein the framing criteria specify a vertical aspect ratio for the crop window.

7. The computer-implemented method of claim 5, wherein the framing criteria specify a square aspect ratio for the crop window.

8. The computer-implemented method of claim 1, wherein the framing criteria are determined based on a machine learning model.

9. The computer-implemented method of claim 8, wherein the machine learning model is trained to specify framing criteria based on a likelihood of receiving a user interaction, wherein the user interaction includes at least one of a number of likes, a number of comments, a number of shares, or a number of clicks a media content item receives.

10. A system comprising:
  at least one processor; and
  a memory storing instructions that, when executed by the at least one processor, cause the system to perform a method comprising:
    receiving a source content item;
    identifying an object in the source content item;
    determining a crop window for the source content item based on framing criteria, wherein the framing criteria specify a plurality changes to the crop window to feature the object within the crop window, and the plurality of changes includes a change to at least a size or a position of the crop window with respect to the source content item so that a location of the object within the crop window is unchanged;
    generating a plurality of cropped media assets from the source content item based on the crop window;
    ranking the plurality of cropped media assets based on a likelihood of receiving a user interaction; and
    based on the ranking, providing at least one cropped media asset from the plurality of cropped media assets for publication.

11. The system of claim 10, wherein the framing criteria specify one or more preferred positions for the object within the crop window.

12. The system of claim 11, wherein at least a subset of the preferred positions is determined based on the Rule of Thirds.

13. The system of claim 10, wherein the framing criteria specify an aspect ratio for the crop window.

14. The system of claim 13, wherein the source content item has a widescreen aspect ratio.

15. The system of claim 14, wherein the framing criteria specify a vertical aspect ratio for the crop window.

16. The system of claim 14, wherein the framing criteria specify a square aspect ratio for the crop window.

17. A non-transitory computer-readable storage medium including instructions that, when executed by at least one processor of a computing system, cause the computing system to perform a method comprising:
  receiving a source content item;
  identifying an object in the source content item;
  determining a crop window for the source content item based on framing criteria, wherein the framing criteria specify a plurality of changes to the crop window to feature the object within the crop window, and the plurality of changes includes a change to at least a size or a position of the crop window with respect to the source content item so that a location of the object within the crop window is unchanged;
  generating a plurality of cropped media assets from the source content item based on the crop window;
  ranking the plurality of cropped media assets based on a likelihood of receiving a user interaction; and
  based on the ranking, providing at least one cropped media asset from the plurality of cropped media assets for publication.

18. The non-transitory computer-readable storage medium of claim 17, wherein the framing criteria specify one or more preferred positions for the object within the crop window.

19. The non-transitory computer-readable storage medium of claim 18, wherein at least a subset of the preferred positions is determined based on the Rule of Thirds.

20. The non-transitory computer-readable storage medium of claim 17, wherein the framing criteria specify an aspect ratio for the crop window.

\* \* \* \* \*